United States Patent
Itani

(10) Patent No.: US 8,705,742 B2
(45) Date of Patent: Apr. 22, 2014

(54) DATA COMPRESSION APPARATUS AND DATA DECOMPRESSION APPARATUS

(75) Inventor: Noriko Itani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 885 days.

(21) Appl. No.: 12/482,261

(22) Filed: Jun. 10, 2009

(65) Prior Publication Data

US 2009/0274294 A1    Nov. 5, 2009

Related U.S. Application Data

(63) Continuation of application No. PCT/JP2006/325906, filed on Dec. 26, 2006.

(51) Int. Cl.
*H04K 1/00*    (2006.01)

(52) U.S. Cl.
USPC ............................................. 380/269

(58) Field of Classification Search
USPC ............................................. 380/269
See application file for complete search history.

(56) References Cited

U.S. PATENT DOCUMENTS

| | | | |
|---|---|---|---|
| 5,604,495 A * | 2/1997 | Watanabe | 341/51 |
| 6,021,199 A | 2/2000 | Ishibashi | |
| 6,122,378 A | 9/2000 | Yoshiura et al. | |
| 6,434,561 B1 * | 8/2002 | Durst et al. | 1/1 |
| 6,956,948 B1 * | 10/2005 | Hwang et al. | 380/46 |
| 7,003,111 B2 * | 2/2006 | Jaquette | 380/46 |
| 7,409,060 B2 * | 8/2008 | Nomizu et al. | 380/200 |
| 2002/0029206 A1 * | 3/2002 | Satoh et al. | 707/1 |
| 2003/0235307 A1 | 12/2003 | Miyamoto | |
| 2005/0169465 A1 | 8/2005 | Itani | |

FOREIGN PATENT DOCUMENTS

| | | |
|---|---|---|
| EP | 0 472 730 A1 | 3/1992 |
| JP | 4-149766 | 5/1992 |
| JP | 5-128101 | 5/1993 |
| JP | 5-128103 | 5/1993 |
| JP | 5-282130 | 10/1993 |
| JP | 6-83574 | 3/1994 |
| JP | 7-87077 | 3/1995 |
| JP | 7-111645 | 4/1995 |
| JP | 10-145773 | 5/1998 |
| JP | 10-294669 | 11/1998 |

(Continued)

OTHER PUBLICATIONS

John G. Cleary et al., "Unbounded Length Contexts for PPM," Proceedings of the Data Compression Conference, 1995, pp. 52-61.

(Continued)

*Primary Examiner* — Krista Zele
*Assistant Examiner* — Esther Benoit
(74) *Attorney, Agent, or Firm* — Fujitsu Patent Center

(57) ABSTRACT

In a first data compression process, a compressed code of an input symbol is generated in accordance with a compression dictionary selected on the basis of P symbols immediately preceding the input symbol, and a (P+1)K+1-th compressed code is encrypted to generate a compressed and encrypted code. Then, compressed and encrypted data comprising compressed and encrypted codes and other compressed codes is output. In a second data compression process, a bit string is added to the head of compression target data, and a compressed code of an input symbol is generated in accordance with a compression dictionary selected on the basis of a bit string or a symbol immediately preceding the input symbol. Then, a plurality of compressed codes are alternately output to different output destinations.

6 Claims, 20 Drawing Sheets

(56) References Cited

FOREIGN PATENT DOCUMENTS

| | | |
|---|---|---|
| JP | 2000-324490 | 11/2000 |
| JP | 2004-23293 | 1/2004 |
| JP | 2004-147218 | 5/2004 |
| JP | 2005-515726 | 5/2005 |
| JP | 2005-202458 | 7/2005 |
| JP | 2005-217842 | 8/2005 |
| JP | 2006-157426 | 6/2006 |
| WO | 97/10659 | 3/1997 |
| WO | 03/061289 A1 | 7/2003 |

OTHER PUBLICATIONS

Tomohiko Uematsu, "Introduction to document data compression algorithm-codes, such as Huffman code, arithmetic code and LZ code, are implemented by using C," CQ Publishing Co., Ltd., 1994, pp. 26-29, 130 and 131.

Partial English translation of Japanese Published Patent Application No. 5-128101.

Partial English translation of Japanese Published Patent Application No. 5-128103.

Partial English translation of Japanese Published Patent Application No. 10-294669.

Partial English translation of Japanese Published Patent Application No. 2004-147218.

Partial English translation of Japanese Published Patent Application No. 2005-202458.

Japanese Office Action issued Aug. 30, 2011 in corresponding Japanese Patent Application 2008-550950.

International Search Report for International Application No. PCT/JP2006/325906, mailed Mar. 13, 2007.

United Kingdom Office Action issued Mar. 9, 2011 in corresponding United Kingdom Patent Application GB0910096.7.

* cited by examiner

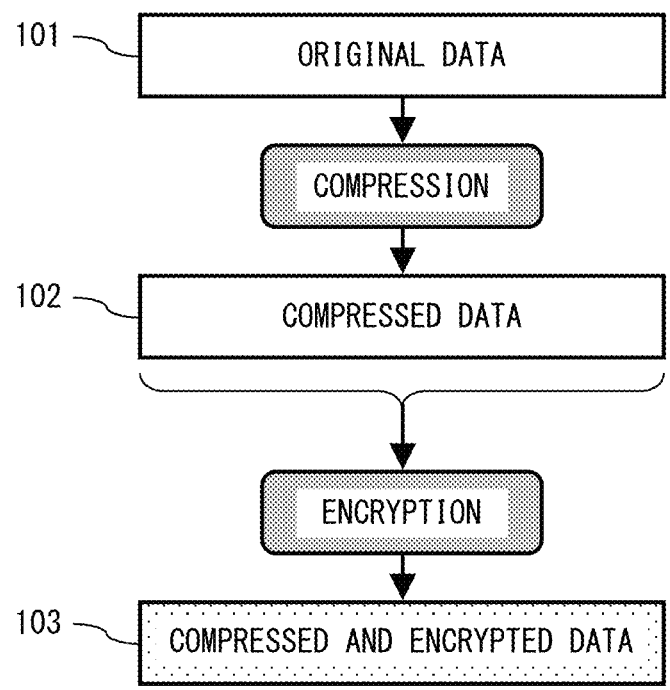
F I G. 1

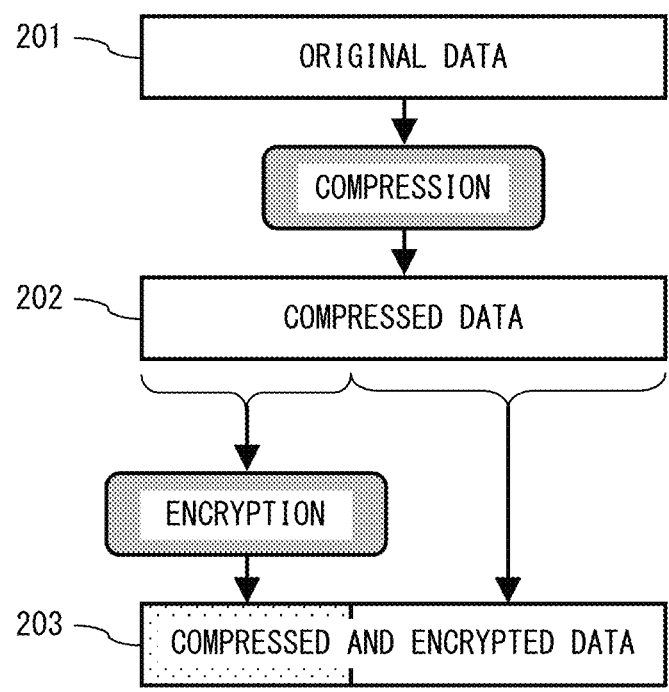
F I G. 2

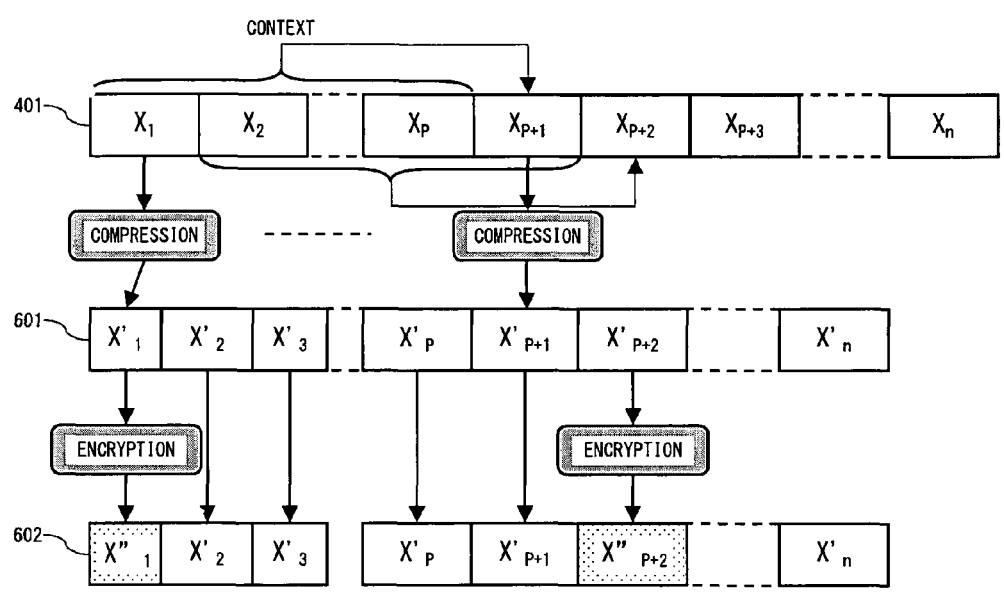
F I G. 6

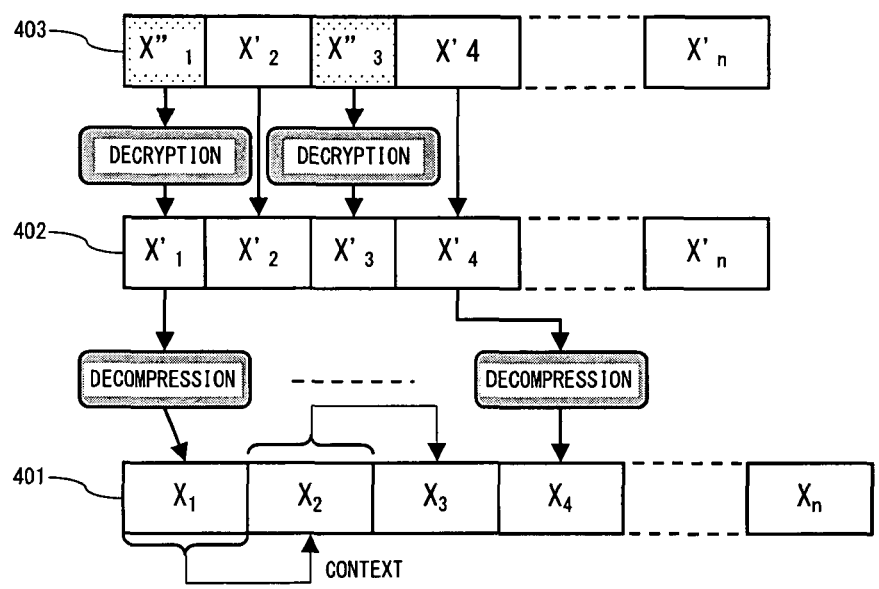
F I G. 1 2

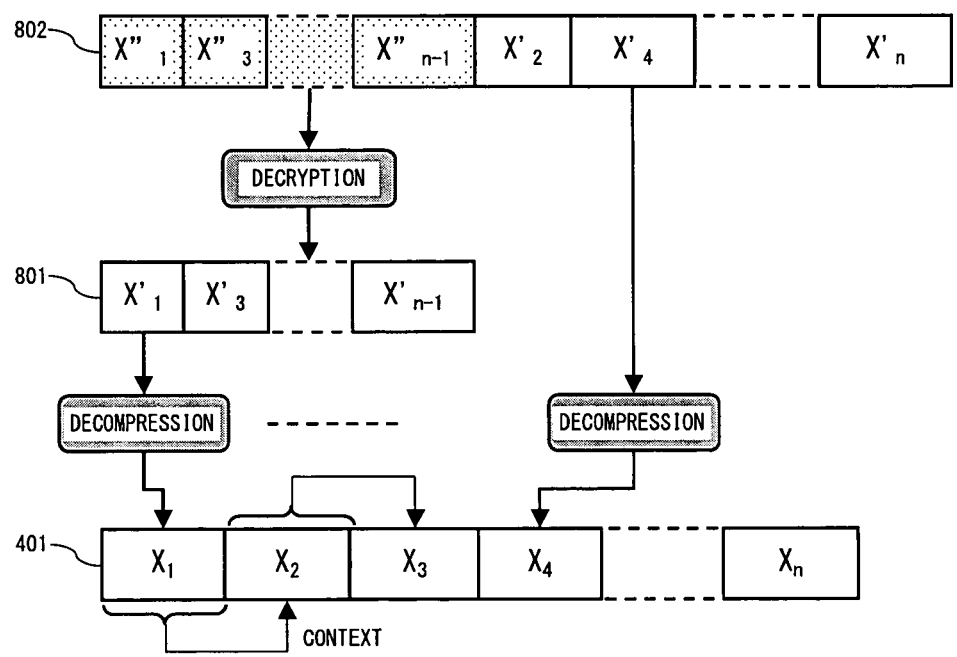
F I G. 1 6

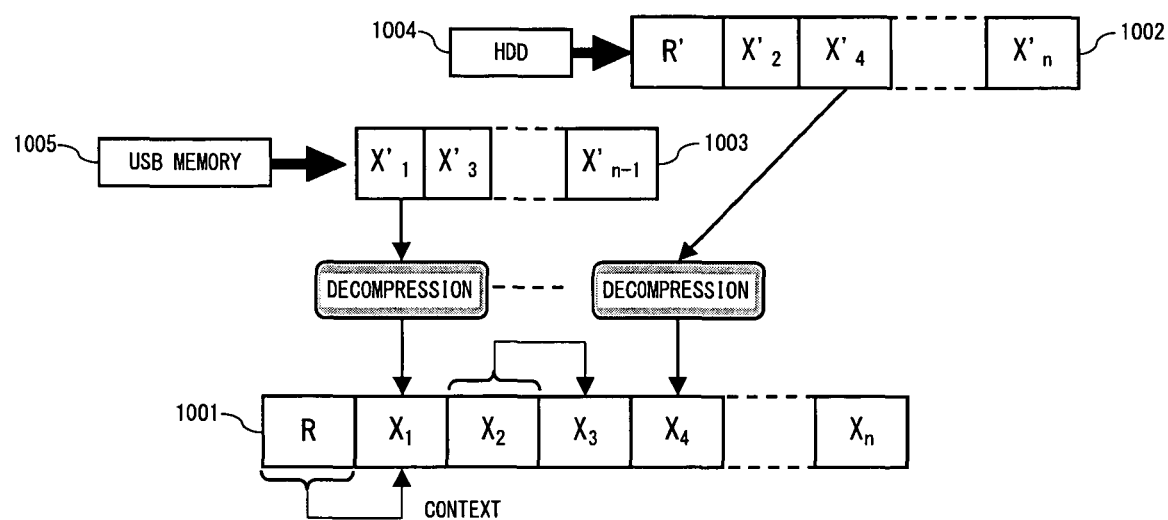
F I G. 1 8

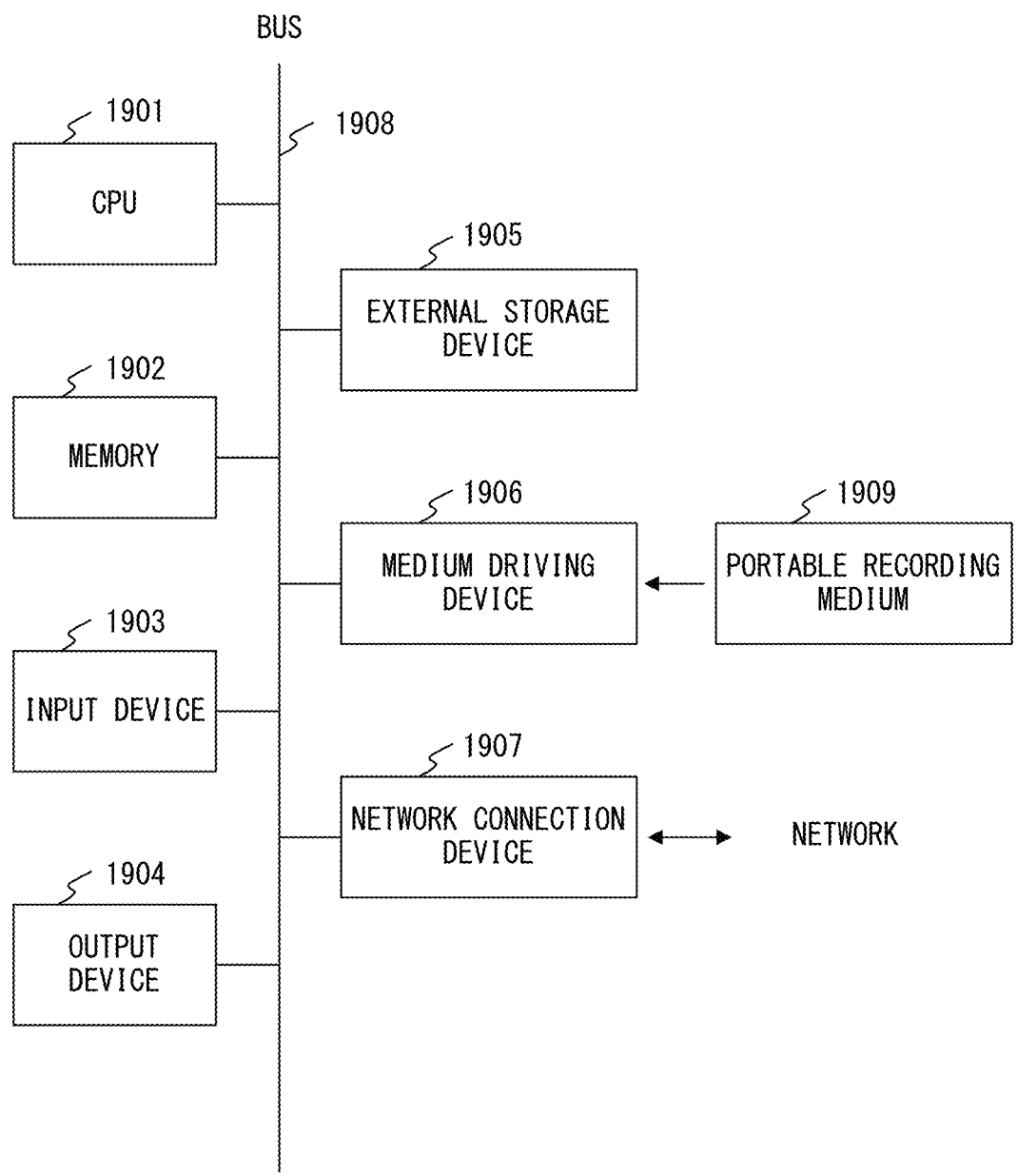
F I G. 19

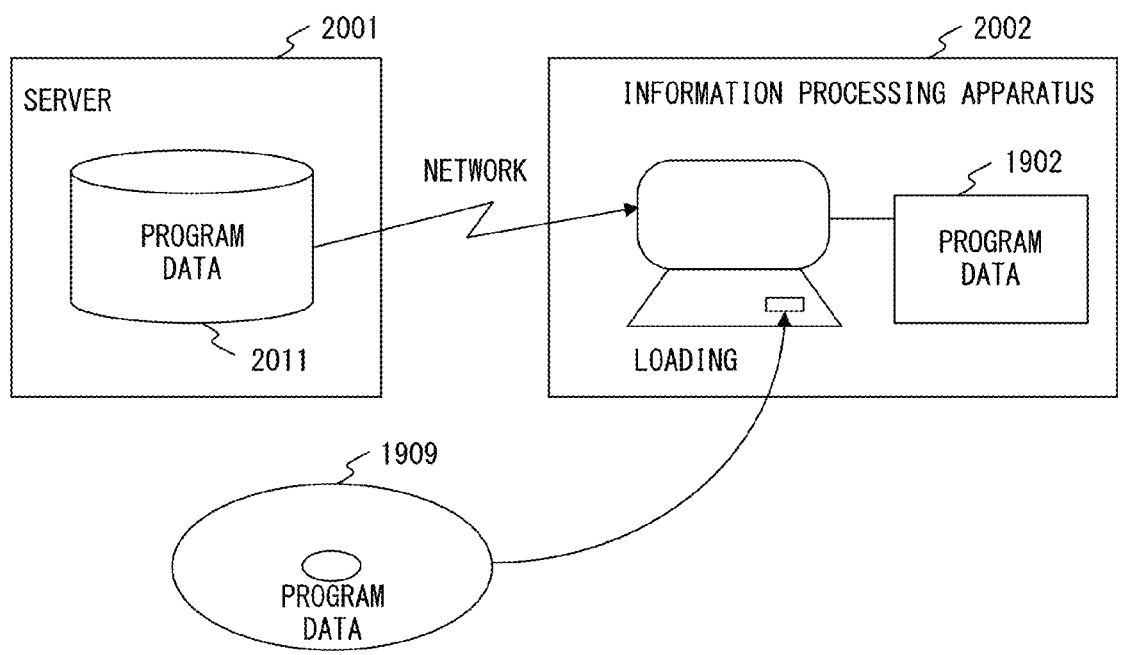
F I G. 20

US 8,705,742 B2

DATA COMPRESSION APPARATUS AND DATA DECOMPRESSION APPARATUS

CROSS-REFERENCE TO RELATED APPLICATIONS

This application is a continuation application, filed under 35 U.S.C. section 111(a), of International PCT Application No. PCT/JP2006/325906 which was filed on Dec. 26, 2006, the entire contents of which are incorporated herein by reference.

FIELD

The present invention relates to an apparatus and a program electronically compressing data for the storage or communication of the data, and to an apparatus and a program electronically decompressing compressed data.

BACKGROUND

In recent years, as various types of data such as character codes, image data and so on are processed by a computer, the data amount to be processed is increasing. In addition, there has been increasing consciousness about the security in storing data and performing data communication, as the Internet and mobile terminals become widely used. Therefore, there have been more cases in which not only data-amount reducing function but also data-concealment function is required.

In a conventional data compression method, the compression process and the cryptographic process are performed independently, as illustrated in FIG. 1. First, in order to reduce the data amount of original data 101, the original data 101 is compressed to generate compressed data 102, and next, in order to ensure the security, the compressed data 102 is encrypted to generate compressed and encrypted data 103. However, this method has a problem that a high processing load is imposed on the computer, since both the compression process and the cryptographic process are performed for the whole of the data.

Therefore, in order to reduce the processing load, a method of reducing encryption target data has been proposed, as illustrated in FIG. 2 (for example, see Patent Document 1 specified below). First, original data 201 is compressed to generate compressed data 202, and next, utilizing a characteristic that it is difficult to decompress the original data 201 from the middle of the compressed data 202, only the head of the compressed data 202 is encrypted to generate compressed and encrypted data 203. However, with this method, the possibility cannot be ruled out that the original data 201 may be decompressed from the middle of the compressed and encrypted data 203 using the frequency distribution analysis and the like.

As a conventional data compression method, the context model compression method has been known (see, for example, Non-patent Document 1 specified below). This method raises the compression rate by increasing the prediction accuracy of the next character by using the context.

Patent Document 2 specified below relates to a method of compression while assigning a scramble value to the head of a data string, and Non-patent document 2 specified below relates to a fixed-to-variable length code (FV code) and a variable-to-fixed length code (VF code).

[Patent Document 1] International Publication Pamphlet No. WO97/10659
[Patent Document 2] Japanese Laid-open Patent Publication No. 2005-217842
[Non-patent Document 1] John G. Cleary et al., "Unbounded Length Contexts for PPM", 1995 IEEE Data Compression Conference, p. 52-61
[Non-patent Document 2] Tomohiko Uematsu, "Introductory Document Data Compression Algorithm", 1994 CQ Publishing, p. 26-28, 131

SUMMARY

An object of the present invention is to reduce the processing load while ensuring security in a data compressing process.

The first data compression apparatus of the present invention has an input unit, a compression dictionary holding unit, a compression unit, a storage unit, an encryption unit and an output unit. The input unit inputs compression target data comprising a plurality of symbols, and the compression dictionary holding unit holds a plurality of compression dictionaries. The compression unit selects a compression dictionary from among the plurality of compression dictionaries on the basis of P symbols immediately preceding an input symbol, P being an integer equal to or more than one, and encodes the input symbol in accordance with the selected compression dictionary thereby generates a compressed code.

The storage unit stores a generated compressed code, and the encryption unit encrypts, in a plurality of compressed codes generated from the plurality of symbols, a $(P+1)K+1$-th compressed code, K being an integer equal to or more than zero, thereby generates a compressed and encrypted code. The output unit outputs the compressed and encrypted code and other compressed codes that have not been encrypted in the plurality of compressed codes.

According to the first data compression apparatus, since different compression dictionaries are used in accordance with P symbols immediately preceding each input symbol, the compressed code of a next symbol is changed in accordance with the P symbols. Accordingly, it becomes difficult for a third party to perform a frequency distribution analysis, decreasing the possibility that the original data is decompressed from the middle of compressed and encrypted data.

Furthermore, the encryption of the $(P+1)K+1$-th compressed code makes it impossible to specify the compression dictionary to be used for the decompression process for the other compressed codes. Therefore, the security can be enhanced without encrypting the whole of the compressed data.

The second data compression apparatus of the present invention has an input unit, a bit addition unit, a compression dictionary holding unit, a compression unit, a storage unit, a first output unit and a second output unit. The input unit inputs compression target data comprising a plurality of symbols, the bit addition unit adds an arbitrary bit string to a head of the compression target data, and the compression dictionary holding unit holds a plurality of compression dictionaries. The compression unit selects a compression dictionary from among the plurality of compression dictionaries on the basis of the bit string or a symbol immediately preceding an input symbol, and encodes the input symbol in accordance with the selected compression dictionary thereby generates a compressed code.

The storage unit stores a generated compressed code, and the first output unit outputs, to a first output destination, a compressed code generated from the bit string and a compressed code generated from an even-numbered symbol in the compression target data. The second output unit outputs, to a second output destination that is different from the first output destination, a compressed code generated from an odd-numbered symbol in the compression target data.

According to the second data compression apparatus, since different compression dictionaries are used in accordance with a symbol immediately precedent to each input symbol, the compressed code of a next symbol is changed in accordance with the symbol. Accordingly, it becomes difficult for a third party to perform a frequency distribution analysis, decreasing the possibility that the original data is decompressed from the middle of compressed and encrypted data.

Furthermore, outputting generated compressed codes alternately to different output destinations makes it impossible to specify the compression dictionary in the decompression process of the compressed code at each output destination. In addition to it, by adding an arbitrary bit string to the head of a compression target data, it becomes impossible to specify the compression dictionary also in the decompression process of the compressed code generated from the first symbol in the original compression target data. Therefore, the security can be enhanced while performing no encryption at all for the compressed data.

The first data decompression apparatus of the present invention has an input unit, a storage unit, a decryption unit, a compression dictionary holding unit, a decompression unit and an output unit. The input unit inputs decompression target data comprising a plurality of compressed and encrypted codes and a plurality of compressed codes, and the storage unit stores input decompression target data. The decryption unit decrypts the plurality of compressed and encrypted codes thereby generates a plurality of compressed codes, and the compression dictionary holding unit holds a plurality of compression dictionaries.

The decompression unit selects a compression dictionary from among the plurality of compression dictionaries on the basis of immediately preceding P symbols obtained by decoding one or more compressed codes immediately preceding a target compressed code when decoding a compressed code string in which a plurality of compressed codes generated by the decryption unit are placed in (P+1)K+1-th positions, P being an integer equal to or more than 1 and K being an integer equal to or more than 0, and a plurality of compressed codes included in the decompression target data are placed in other positions, and decodes the target compressed code in accordance with the selected compression dictionary thereby generates a symbol. The output unit outputs a plurality of symbols generated from the compressed code string.

According to the first data decompression apparatus, the decryption and decompression of compressed and encrypted data generated by the first data compression apparatus can be performed.

The second data decompression apparatus of the present invention has a first input unit, a second input unit, a storage unit, a compression dictionary holding unit, a decompression unit, a bit elimination unit and an output unit. The first input unit inputs a plurality of compressed codes from a first input source, and the second input unit inputs a plurality of compressed codes from a second input source that is different from the first input source. The storage unit stores input compressed codes. The compression dictionary holding unit holds a plurality of compression dictionaries.

The decompression unit selects a compression dictionary from among the plurality of compression dictionaries on the basis of a bit string obtained by decoding a first compressed code or on the basis of a symbol obtained by decoding a compressed code immediately preceding a target compressed code when decoding a compressed code string in which the plurality of compressed codes input by the first input unit are placed in odd-numbered positions and the plurality of compressed codes input by the second input unit are placed in even-numbered positions, and decodes the target compressed code in accordance with the selected compression dictionary thereby generates a symbol. The bit elimination unit eliminates the bit string in the bit string and a plurality of symbols generated from the compressed code string, and the output unit outputs the plurality of symbols.

According to the second data decompression apparatus, the decompression of compressed data generated by the second data compression apparatus can be performed.

BRIEF DESCRIPTION OF DRAWINGS

FIG. 1 is a diagram illustrating the first conventional data compression method.

FIG. 2 is a diagram illustrating the second conventional data compression method.

FIG. 6 is a diagram illustrating a data compression process using a P-th order context model compression method.

FIG. 12 is a diagram illustrating a data decompression process using a first order context model decompression method.

FIG. 16 is a diagram illustrating a data decompression process of compressed and encrypted data in which encryption parts are collected in one place.

FIG. 18 is a diagram illustrating a data decompression process for which compressed data is input from two input sources.

FIG. 19 is a configuration diagram of an information processing apparatus.

FIG. 20 is a diagram illustrating a method of providing a program and data.

DESCRIPTION OF EMBODIMENTS

Hereinafter, best modes for carrying out the present invention will be described in detail with reference to the drawings.

The data compression apparatus in the present embodiment compresses data using the context model compression method described in Non-patent Document 1. While compression target data (original data) is generally composed of a plurality of symbols, hereinafter, the explanation is made assuming a character string composed of a plurality of characters as the compression target data.

Figure 3:
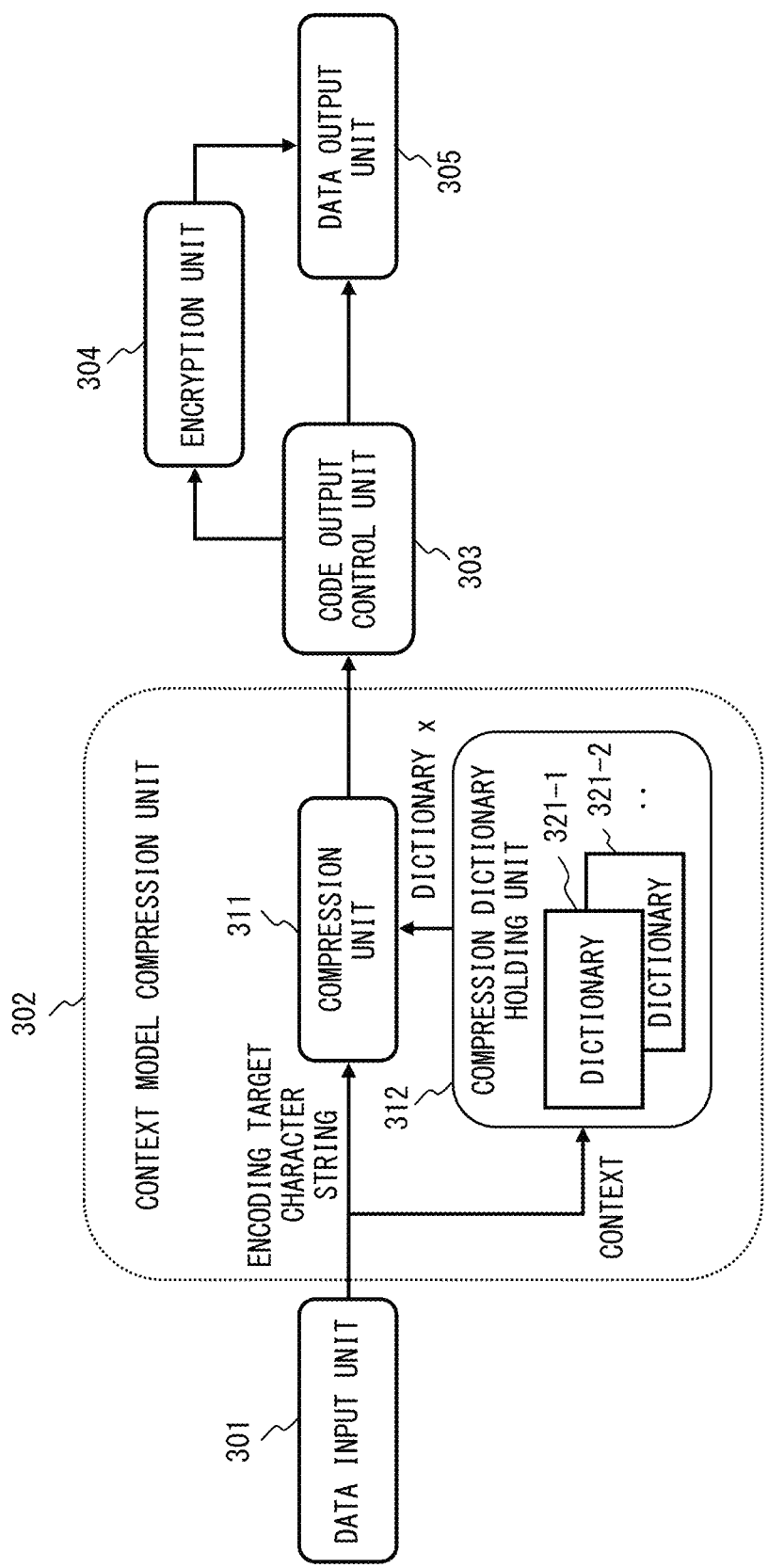
FIG. 3 is a configuration diagram of the first data compression apparatus according to the present invention.

FIG. 3 illustrates a configuration example of such a data compression apparatus. The data compression apparatus has a data input unit 301, a context model compression unit 302, a code output control unit 303, an encryption unit 304 and a data output unit 305. The context model compression unit 302 includes a compression unit 311 and a compression dictionary holding unit 312 holding a plurality of compression dictionaries (code tables) including dictionaries 321-1 and 321-2.

The data input unit 301 inputs an encoding target character string to the compression unit 311 and the compression dictionary holding unit 312 one character at a time. The compression dictionary holding unit 312 selects a dictionary x to be used for the compression in accordance with a context, using one or more characters immediately preceding a character input to the compression unit 311 (immediately-precedent character string) as the context and outputs the dictionary x to the compression unit 311. The compression unit 311 encodes the input character to generate a compressed code, and outputs it to the code output control unit 303.

Meanwhile, when encoding the first character in the encoding target character string, the dictionary x is selected using, for example, null as the context.

The code output control unit 303 extracts, from a compressed code string output from the compression unit 311, a compressed code at predetermined intervals, and outputs it to the encryption unit 304, while outputting other compressed codes to the data output unit 305. The encryption unit 304 encrypts the compressed code received from the code output control unit 303 to generate a compressed and encrypted code, and outputs it to the data output unit 305.

Then, the data output unit 305 inserts the compressed and encrypted code received from the encryption unit 304 to its original position in the compressed code string output from the code output control unit 303 to generate and output compressed and encrypted data.

According to the context model compression method, since different compression dictionaries are used depending on the contexts, the compression method for a next character is changed in accordance with a context. Therefore, it becomes difficult for a third party to perform a frequency distribution analysis, decreasing the possibility that the original data is decompressed from the middle of compressed and encrypted data.

Furthermore, the encryption of the compressed code of a character that is to be the context makes the context unknown in the decompression process for other compressed codes, making it impossible to specify the compression dictionary to be used. Therefore, the security can be enhanced with the encryption of the compressed codes at predetermined intervals only, without encrypting the whole of the compressed data.

Figure 4:
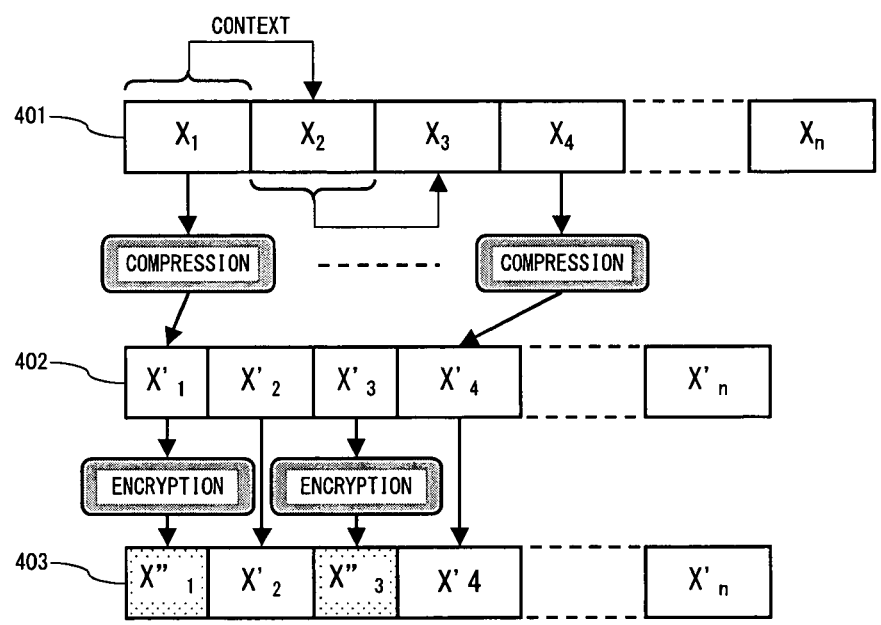
FIG. 4 is a diagram illustrating a data compression process using a first order context model compression method.

FIG. 4 illustrates a data compression process in the case of adopting a first order context model compression method. In this case, a character string composed of n characters $X_1$ through $X_n$ is input as compression target data 401, and a dictionary is selected using a character immediately preceding each character as the context. Then, the encoding by means of an FV code is performed using the dictionary, to generate compressed data 402 composed of n compressed codes $X'_1$ through $X'_n$.

The FV code is an encoding method in which a variable-length code is assigned to fixed-length data in accordance with the probability of occurrence, the Huffman code and the Splay code corresponding to it, for example.

Next, only the odd-numbered compressed codes in the compressed data 402 are encrypted to generate compressed and encrypted codes $X''_1$, $X''_3$, and so on, which are inserted in their original positions in the compressed data 402. Accordingly, compressed and encrypted data 403 that includes the even-numbered compressed codes without change is generated.

Figure 5:
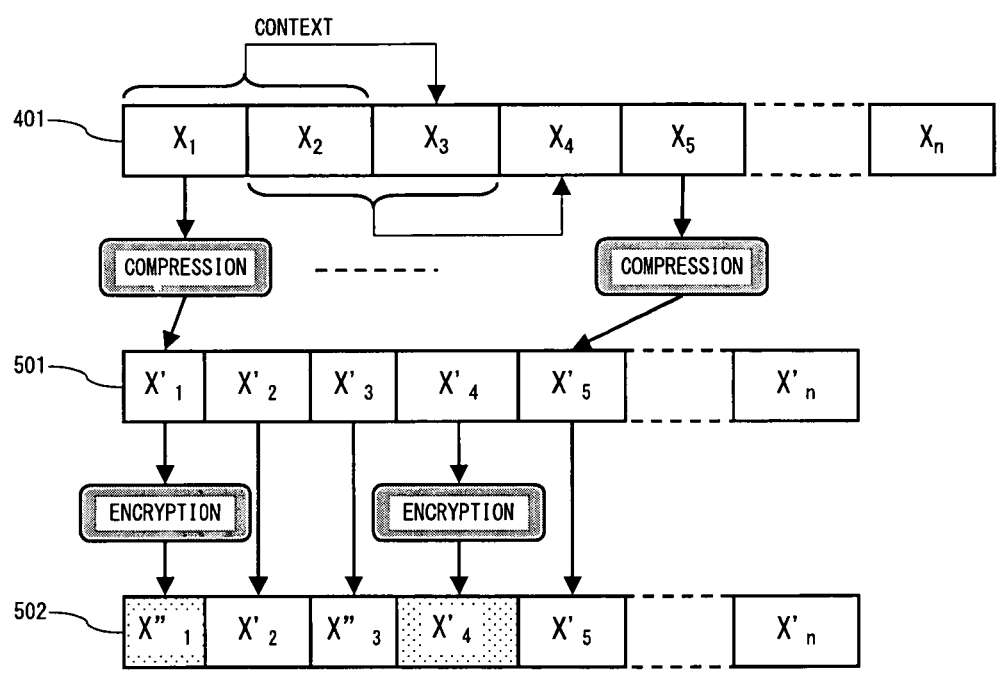
FIG. 5 is a diagram illustrating a data compression process using a second order context model compression method.

FIG. 5 illustrates a data compression process in the case of adopting a second order context model compression method. In this case, a dictionary is selected using two characters immediately preceding each character as the context in compression target data 401. Then, the encoding by means of the FV code is performed using the dictionary, to generate compressed data 501 composed of n compressed codes $X'_1$ through $X'_n$.

Next, only the 3K+1-th (where K is an integer equal to or more than zero) compressed codes in the compressed data 501 are encrypted to generate compressed and encrypted codes $X''_1$, $X''_4$, and so on, which are inserted in their original positions in the compressed data 501. Accordingly, compressed and encrypted data 502 that includes the compressed codes in the other positions without change is generated.

FIG. 6 illustrates a data compression process in the case of adopting a P-th order context model compression method (where P is an integer equal to or more than 1). In this case, a dictionary is selected using P characters immediately preceding each character as the context in compression target data 401. Then, the encoding by means of the FV code is performed using the dictionary, to generate compressed data 601 composed of n compressed codes $X'_1$ through $X'_n$.

Next, only the (P+1)K+1-th compressed codes in the compressed data 601 are encrypted to generate compressed and encrypted codes $X''_1$, $X''_{P+2}$, and so on, which are inserted in their original positions in the compressed data 601. Accordingly, compressed and encrypted data 602 that includes the compressed codes in the other positions without change is generated. The data compression process illustrated in FIG. 4 is performed when P=1, and the data compression process illustrated in FIG. 5 is performed when P=2.

Meanwhile, in addition to the (P+1)K+1-th compressed codes in the compressed data 601, a part of the compressed codes in the other positions may further be encrypted.

Figure 7:
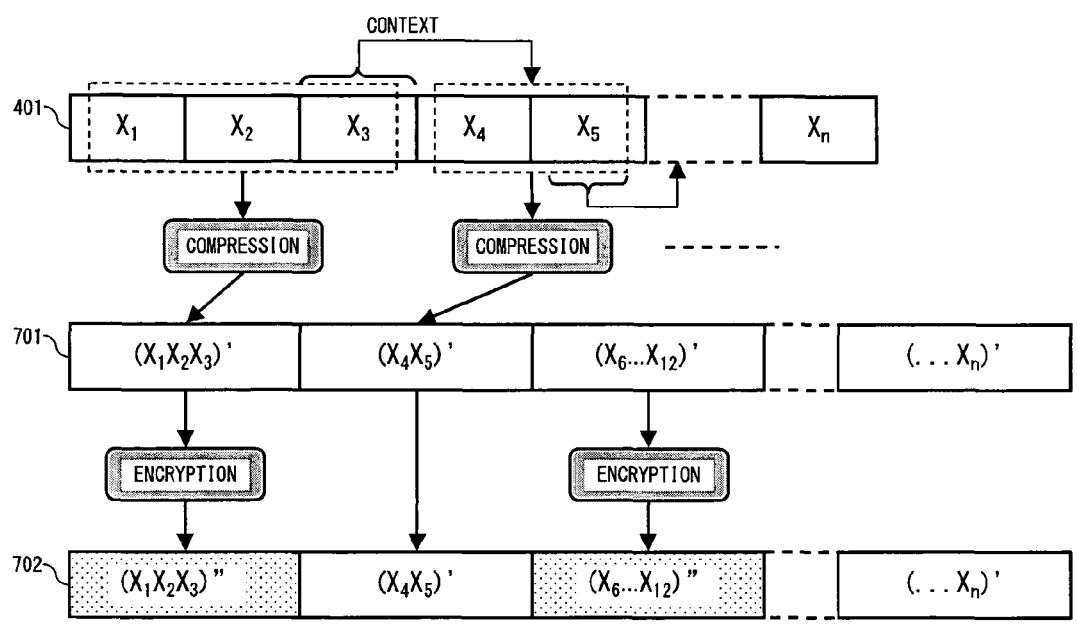
FIG. 7 is a diagram illustrating a data compression process using a VF code.

FIG. 7 illustrates an example in which a VF code is used instead of the FV code in the data compression process in FIG. 4. The VF code is an encoding method in which a character string that repeatedly appears in the data compression is encoded as a single batch, the LZ78 code corresponding to it, for example.

In this case, a dictionary is selected using a character immediately preceding each character as the context in compression target data 401. Then, the encoding of each character string by means of the VF code is performed using the dictionary, to generate, for example, compressed codes $(X_1 X_2 X_3)'$, $(X_4 X_5)'$ and $(X_6 \ldots X_{12})'$ from character strings $X_1 X_2 X_3$, $X_4 X_5$ and $X_6 \ldots X_{12}$.

Next, only the odd-numbered compressed codes in the compressed data 701 including the compressed codes are encrypted to generate compressed and encrypted codes $(X_1 X_2 X_3)''$, $(X_6 \ldots X_{12})''$ and so on, which are inserted in their original positions in the compressed data 701. Accordingly, compressed and encrypted data 702 that includes the even-numbered compressed codes without change is generated.

The VF code can be used instead of the FV code for data compression processes in FIG. 5 and FIG. 6 in a similar manner.

Meanwhile, in the data compression processes in FIG. 4 through FIG. 7, the encryption parts and the non-encryption parts are alternately positioned, since the compressed and encrypted data is output with no rearrangement. In this regard, the compressed and encrypted data may be rearranged and output so that the encryption parts are collected in one place.

Figure 8:
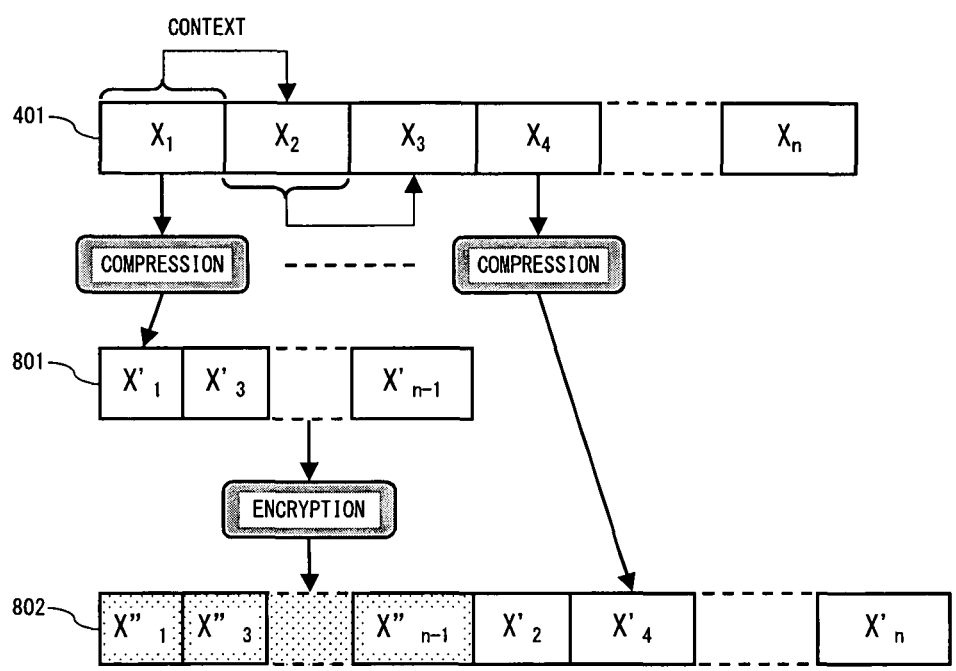
FIG. 8 is a diagram illustrating a data compression process in which encryption parts are collected in one place.

FIG. 8 illustrates an example of performing such an arrangement in the data compression process in FIG. 4. In the case in which n is an even number, the code output control unit 303 collects odd-numbered compressed codes $X'_1$, $X'_3, \ldots, X'_{n-1}$ as a single batch and outputs it to the encryption unit 304, and collects even-numbered $X'_2, X'_4, \ldots, X'_n$ as a single batch and outputs it to the data output unit 305. The encryption unit 304 encrypts the single batch of the compressed codes received from the code output control unit 303 and outputs it to the data output unit 305.

Then, the data output unit 305 adds the compressed and encrypted code string received from the encryption unit 304 to the head of the compressed code string output from the code output control unit 303 to generate and output compressed and encrypted data 802.

A rearrangement of compressed and encrypted data can be performed so that encryption parts are collected in one place, for the data compression processes in FIG. 5 and FIG. 6 in a similar manner.

While the data compression processes described above enhance the security by encrypting a part of compressed codes, the security can be ensured by, instead of performing the encryption, outputting a part of compressed codes to another storage apparatus or a communication network.

Figure 9:
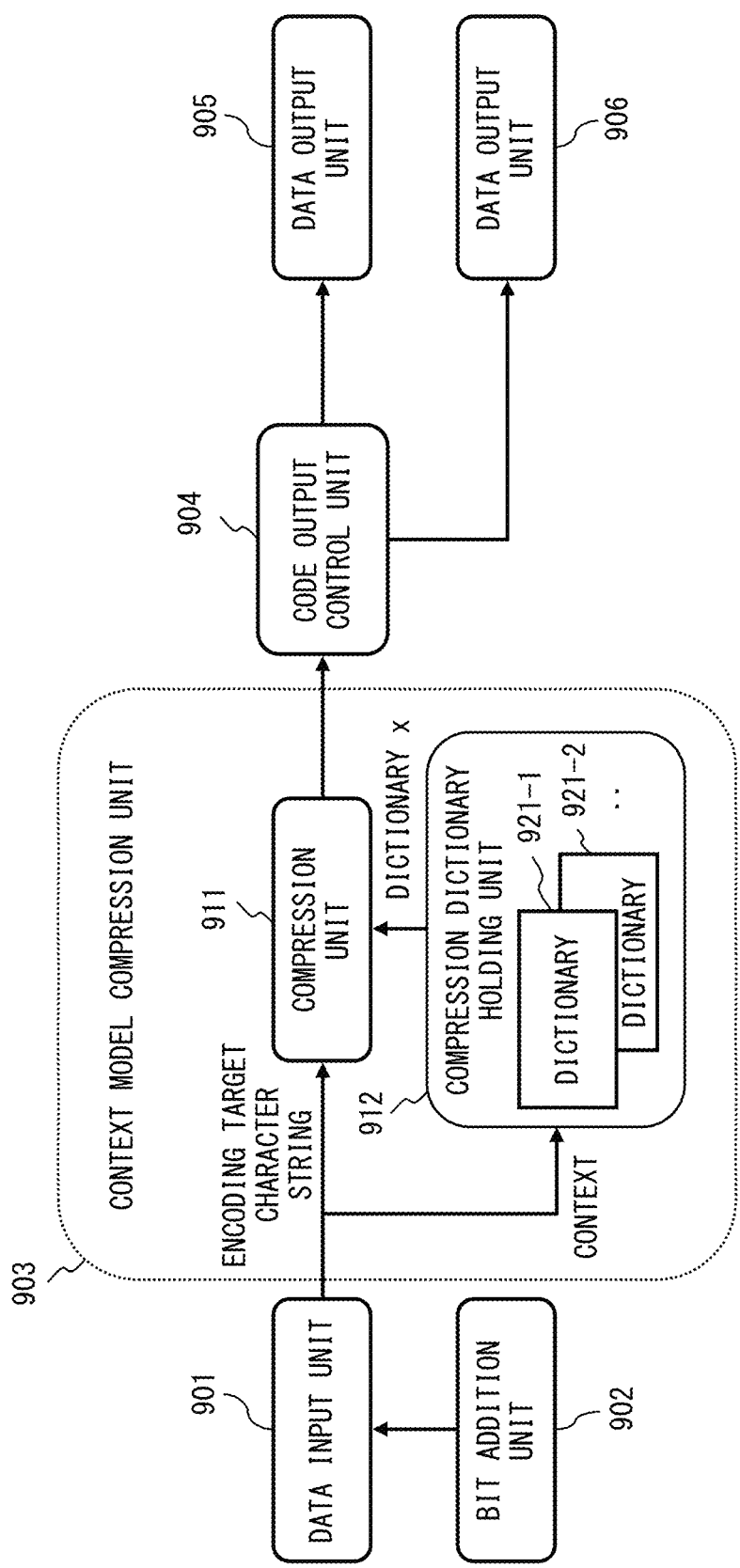
FIG. 9 is a configuration diagram of the second data compression apparatus according to the present invention.

FIG. 9 illustrates a configuration example of such a data compression apparatus. The data compression apparatus has a data input unit 901, a bit addition unit 902, a context model compression unit 903, a code output control unit 904, and data output units 905, 906. The context model compression unit 903 includes a compression unit 911 and a compression dictionary holding unit 912 holding a plurality of compression dictionaries including dictionaries 921-1 and 921-2.

The bit addition unit 902 adds, to the head of an encoding target character string, an arbitrary bit string as a random number. A predetermined length or a length specified by an operator is used as the bit length of the random number. The data input unit 901 inputs the encoding target character string with the added random number being the first character to the compression unit 911 and the compression dictionary holding unit 912 one character at a time. The operation of the context model compression unit 903 is similar to that of the context model compression unit 302 in FIG. 3 adopting the first order context model compression method.

The code output control unit 904 outputs the odd-numbered compressed codes in a compressed code string output from the compression unit 911 to the data output unit 905, and outputs the even-numbered compressed codes to the data output unit 906. Accordingly, the compressed codes generated from the random number and the compressed codes generated from the even-numbered characters in the original encoding target character string are output to the data output unit 905. Meanwhile, the compressed codes generated from the odd-numbered characters in the original encoding target character string are output to the data output unit 906.

The data output unit 905 outputs the received compressed codes to a first output destination, and the data output unit 906 outputs the received compressed codes to a second output destination. Different storage apparatuses/communication networks are assigned respectively as the first and second output destinations.

As described above, according to the context model compression method, different compression dictionaries are used depending on the contexts, decreasing the possibility that the original data is decompressed from the middle of compressed and encrypted data.

Furthermore, storing/transferring the compressed code of a character that is to be the context in/to another output destination makes it impossible to specify the compression dictionary in the decompression process for the other compressed codes. In addition to it, by adding a random number to the head of an encoding target character string, it becomes impossible to specify the compression dictionary also in the decompression process of the compressed code generated from the first character in the original encoding target character string, unless the value of the random value is known. Therefore, the security can be enhanced while performing no encryption at all for the compressed data.

Figure 10:
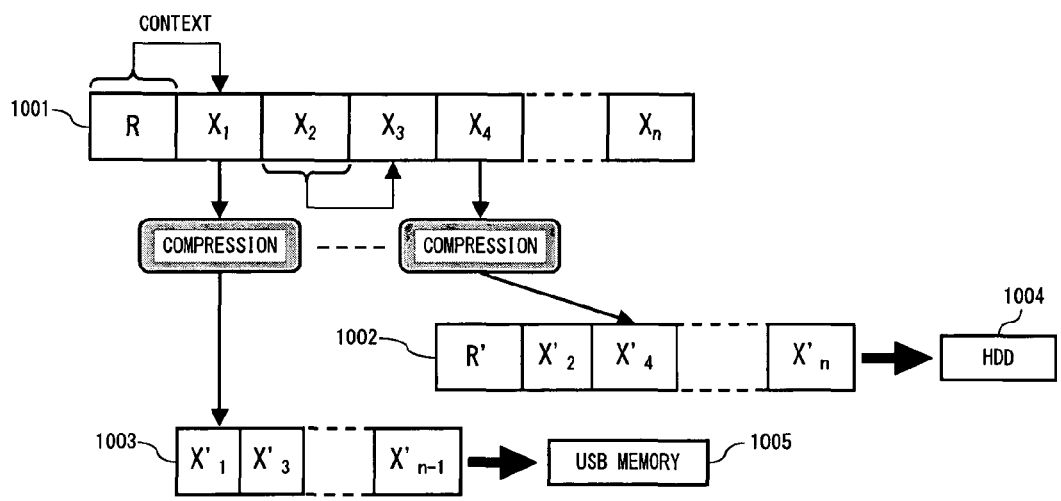
FIG. 10 is a diagram illustrating a data compression process in which compressed data is output to two output destinations.

FIG. 10 illustrates a data compression process in the case of adopting a first order context model compression method. In this case, a character string comprising n characters $X_1$ through $X_n$ is input as compression target data, and a random number R is added to the head of it to generate compression target data 1001 that contains one more character. Then, a dictionary is selected using a character immediately preceding each character of the compression target data 1001 as the context. Then, the encoding using the dictionary is performed to generate n+1 compressed codes $R'$ and $X'_1$ through $X'_n$.

In the case in which n is an even number, compressed data 1002 comprising the compressed code $R'$ and the compressed codes $X'_2, X'_4, \ldots, X'_n$ generated from the even-numbered characters in the original compression target data is stored in a hard disk drive (HDD) 1004. On the other hand, compressed data 1003 comprising the compressed codes $X'_1, X'_3, \ldots, X'_{n-1}$ generated from the odd-numbered characters in the original compression target data is stored in a USB (Universal Serial Bus) memory 1005. Since the original compression target data cannot be decompressed from the compressed data 1002 only, or the compressed data 1003 only, the secrecy of the data is ensured.

Next, configurations and operations of a data decompression apparatus are explained, with reference to FIG. 11 through FIG. 18. Compressed and encrypted data or compressed data generated by the data compression apparatus in FIG. 3 or FIG. 9 is input to the data decompression apparatus, as decompression target data.

Figure 11:
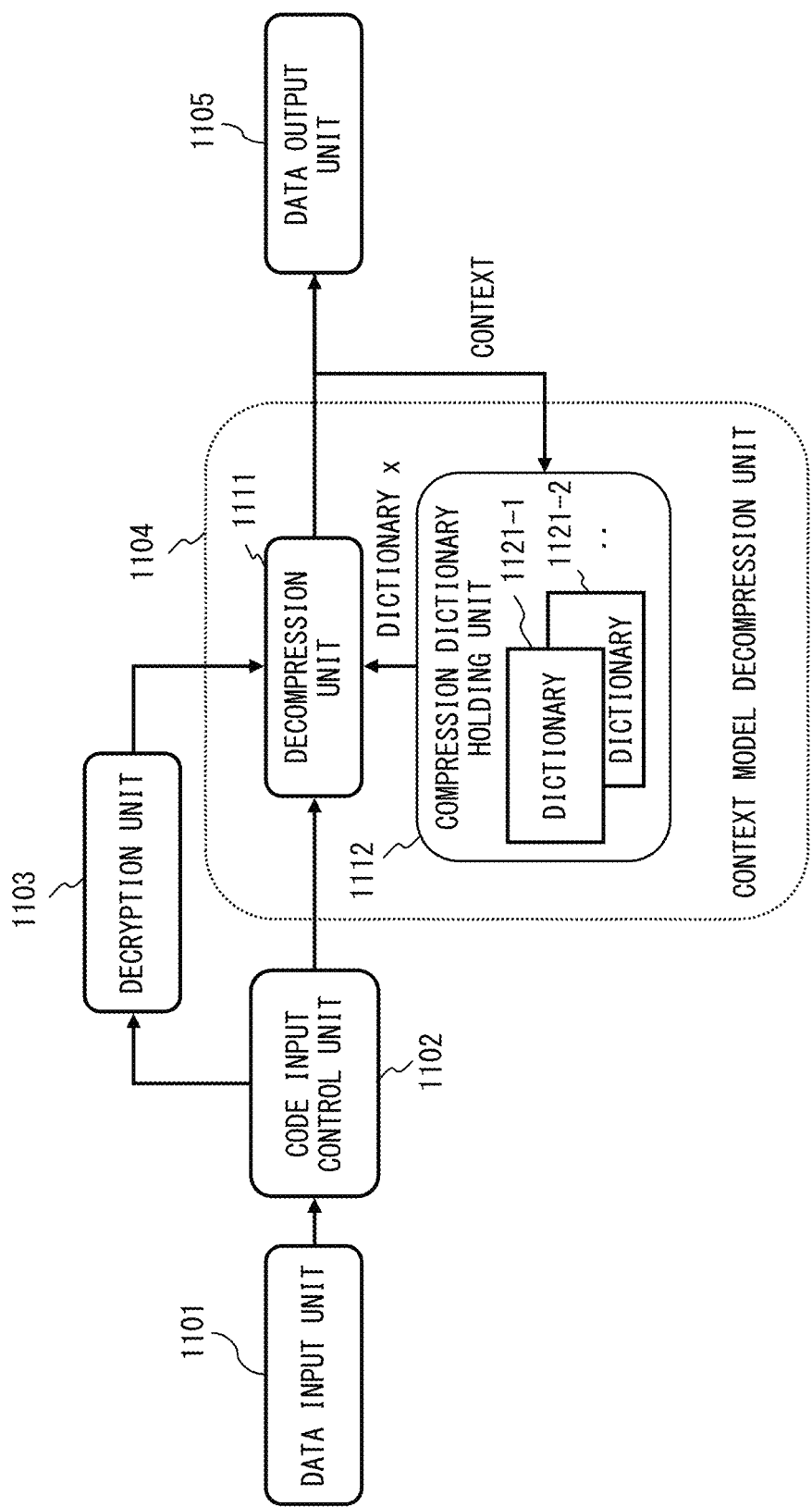
FIG. 11 is a configuration diagram of the first data decompression apparatus according to the present invention.

FIG. 11 illustrates a configuration example of a data decompression apparatus that decompresses compressed and encrypted data generated by the data compression apparatus in FIG. 3. The data decompression apparatus has a data input unit 1101, a code input control unit 1102, a decryption unit 1103, a context model decompression unit 1104, and a data output unit 1105. The context model decompression unit 1104 includes a decompression unit 1111, and a compression dictionary holding unit 1112 holding a plurality of compression dictionaries including dictionaries 1121-1 and 1121-2.

The data input unit 1101 inputs decompression target data comprising compressed and encrypted codes and compressed codes to the code input control unit 1102, and the code input control unit 1102 extracts a compressed and encrypted code from the input decompression target code string at predetermined intervals, and outputs it to the decryption unit 1103, while outputting other compressed and encrypted codes to the decompression unit 1111. The decryption unit 1103 decrypts the compressed and encrypted code received from the code input control unit 1102 to generate a compressed code, and outputs it to the decompression unit 1111.

The decompression unit 1111 inserts the compressed code received from the decryption unit 1103 to the original position in the compressed code string output from the code input control unit 1102, to generate a compressed code string. Then, the compressed code string is decompressed one code at a time in accordance with a dictionary x output from the compression dictionary holding unit 1112, and the obtained character is output. The compression dictionary holding unit 1112 selects the dictionary x to be used for the decompression in accordance with a context, using one or more characters (immediately-precedent character string) output from the decompression unit 1111 as the context, and outputs the dictionary x to the decompression unit 1111.

Meanwhile, when decoding the first character in a compressed code string, the dictionary x is selected using, for example, null as the context.

The data output unit 1105 outputs the character string output from the decompression unit 1111 as the original data.

FIG. 12 illustrates a data decompression process in the case of adopting a first order context model decompression method. In this case, compressed and encrypted data 403 illustrated in FIG. 4 is input as decompression target data, in which only the odd-numbered compressed and encrypted codes are decrypted to generate compressed codes $X'_1$, $X'_3$ and so on, which are then inserted in the original positions in the compressed and encrypted data 403. Accordingly, compressed data 402 that includes the even-numbered compressed codes without change is generated.

Next, a dictionary is selected using, as a context, a character obtained by decoding a compressed code immediately preceding each compressed code in the compressed data 402. Then each compressed code is decoded using the dictionary, to generate the original data 401.

Figure 13:
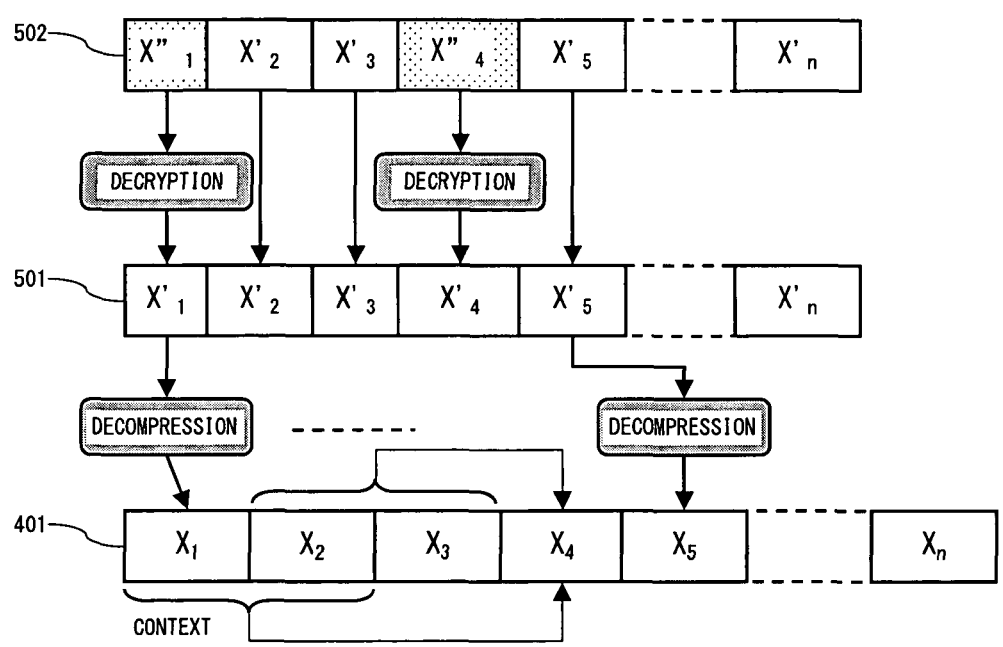
FIG. 13 is a diagram illustrating a data decompression process using a second order context model decompression method.

FIG. 13 illustrates a data decompression process in the case of adopting a second order context model decompression method. In this case, compressed and encrypted data 502 illustrated in FIG. 5 is input as decompression target data, in which only 3K+1-th compressed and encrypted codes are decrypted to generate compressed codes $X'_1$, $X'_4$ and so on, which are then inserted in the original positions in the compressed and encrypted data 502. Accordingly, compressed data 501 that includes the compressed codes in the other positions without change is generated.

Next, a dictionary is selected using, as a context, two characters obtained by decoding two compressed codes immediately preceding each compressed code in the compressed data 501. Then each compressed code is decoded using the dictionary, to generate the original data 401.

Figure 14:
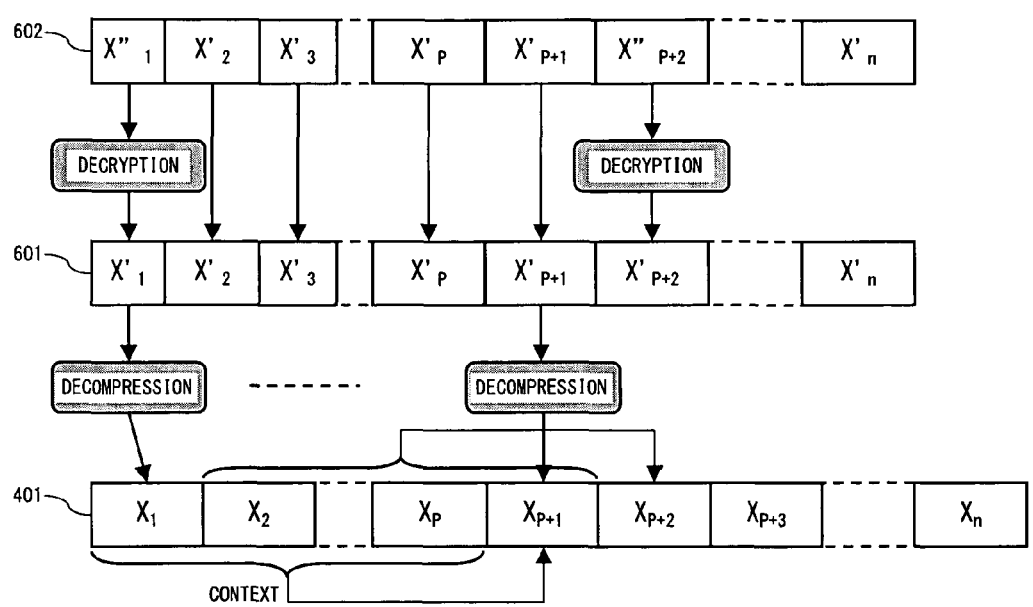
FIG. 14 is a diagram illustrating a data decompression process using a P-th order context model decompression method.

FIG. 14 illustrates a data decompression process in the case of adopting a P-th order context model decompression method. In this case, compressed and encrypted data 602 illustrated in FIG. 6 is input as decompression target data, in which only odd-numbered compressed and encrypted codes are decrypted to generate compressed codes $X'_1$, $X'_{P+2}$ and so on, which are then inserted in the original positions in the compressed and encrypted data 602. Accordingly, compressed data 601 that includes the compressed codes in the other positions without change is generated.

Next, a dictionary is selected using, as a context, P characters obtained by decoding P compressed codes immediately preceding each compressed code in the compressed data 601. Then, each compressed code is decoded using the dictionary, to generate the original data 401. The data decompression process illustrated in FIG. 12 is performed when P=1, and the data decompression process illustrated in FIG. 13 is performed when P=2.

Figure 15:
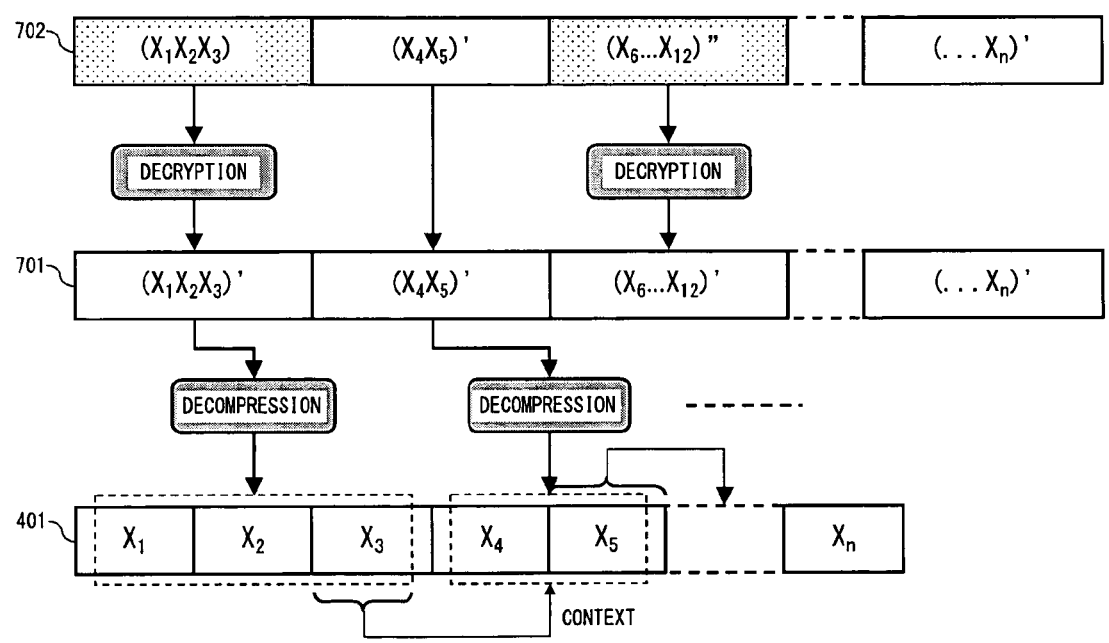
FIG. 15 is a diagram illustrating a data decompression process of data compressed and encrypted using a VF code.

FIG. 15 illustrates a data decompression process of the compressed and encrypted data 702 illustrated in FIG. 7. In this case, the compressed and encrypted data 702 is input as decompression target data, of which only the odd-numbered compressed and encrypted codes are decrypted to generate $(X_1 X_2 X_3)'$, $(X_6 \ldots X_{12})'$ and so on, which are inserted in their original positions in the compressed and encrypted data 702. Accordingly, compressed data 701 that includes the compressed codes in the other positions without change is generated.

Next, a dictionary is selected using, as a context, a character obtained by decoding a compressed code immediately preceding each compressed code in the compressed data 701. Then each compressed code is decoded using the dictionary, to generate the original data 401.

Meanwhile, compressed and encrypted data generated using the VF code instead of the FV code in the data compression processes in FIG. 5 and FIG. 6 can be decompressed in a similar manner.

FIG. 16 illustrates a data decompression process of the compressed and encrypted data 802 illustrated in FIG. 8. In this case, the compressed and encrypted data 802 is input as decompression target data, and the code input control unit 1102 outputs a compressed and encrypted code string at the head of the compressed and encrypted data 802 to the decryption unit 1103, and outputs the subsequent compressed code string to the decompression unit 1111. The decryption unit 1103 decrypts the compressed and encrypted code string received from the code input control unit 1102 as a single batch to generate compressed data 801, and outputs it to the decompression unit 1111.

The decompression unit 1111 decodes the compressed code string in accordance with the first order context model decompression method using the compressed codes included in the compressed data 801 as the odd-numbered compressed codes $X'_1, X'_3, \ldots, X'_{n-1}$, and using the compressed codes output from the code input control unit 1102 as the even-numbered compressed codes $X'_2, X'_4, \ldots, X'_n$, to generate the original data 401.

Meanwhile, rearranged compressed and encrypted data in which encryption parts are collected in one place in the data compression processes in FIG. 5 and FIG. 6 can be decompressed in a similar manner.

Figure 17:
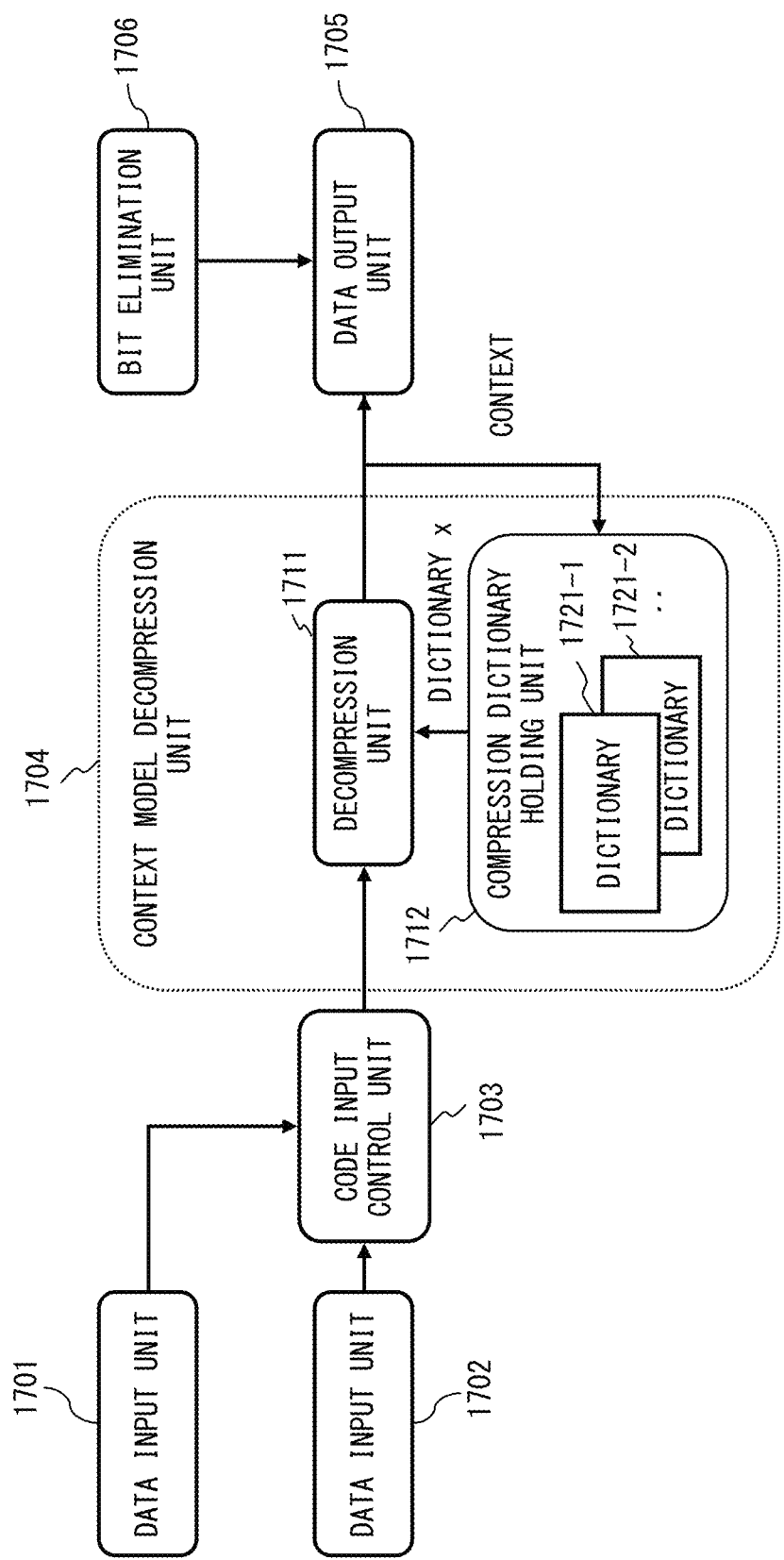
FIG. 17 is a configuration diagram of the second data decompression apparatus according to the present invention.

FIG. 17 illustrates a configuration example of a data decompression apparatus that decompresses compressed data generated by the data compression apparatus in FIG. 9. The data decompression apparatus has data input units 1701, 1702, a code input control unit 1703, a context model decompression unit 1704, a data output unit 1705, and a bit elimination unit 1706. The context model decompression unit 1704 includes a decompression unit 1711 and a compression dictionary holding unit 1712 holding a plurality of compression dictionaries including dictionaries 1721-1 and 1721-2.

The data input unit 1701 inputs compressed codes from a first input source to the code input control unit 1102, and the data input unit 1702 inputs compressed codes from a second input source to the code input control unit 1102. Different storage apparatuses/communication networks are used respectively as the first and second input sources.

The code input control unit 1102 outputs to the decompression unit 1711 a compressed code string in which the compressed codes input by the data input unit 1701 are placed in the odd-numbered positions and the compressed codes input by the data input unit 1702 are placed in the eve-numbered positions. The operation of the context model decompression unit 1704 after that is similar to that of the context model decompression unit 1104 in FIG. 11 in the case of adopting the first order context model decompression method.

The decompression unit 1111 outputs a character string in which a random number is placed as the first character to the data output unit 1705, and the bit elimination unit 1706 eliminates a bit string corresponding to the random number from the head of the character string. Then, the data output unit 1705 outputs, as the original data, the character string from which the bit string is eliminated.

FIG. 18 illustrates the data decompression process of the compressed data 1002 and 1003 illustrated in FIG. 10. In this case, the compressed data 1002 is input from the HDD 1004, and the compressed data 1003 is input from the USB memory 1005.

Next, the compressed code string is decompressed in accordance with the first order context model decompression method using the compressed codes $X'_2, X'_4, \ldots, X'_n$ included in the compressed data 1002 as the odd-numbered compressed codes, and using the compressed codes $X'_1, X'_3, \ldots, X'_{n-1}$ included in the compressed data 1003 as the even-numbered compressed codes, to generate a character string 1001. Then, a random number R at the head of the character string 1001 is eliminated to generate the original data.

The data compression apparatuses in FIG. 3 and FIG. 9, and the data decompression apparatuses in FIG. 11 and FIG. 17 are configured, for example, using an information processing apparatus (computer) as illustrated in FIG. 19. The information processing apparatus in FIG. 19 has a CPU (central processing unit) 1901, a memory 1902, an input device 1903, an output device 1904, an external storage device 1905, a medium driving device 1906, and a network connection device 1907, which are connected to each other by means of a bus 1908.

The memory 1902 includes, for example, a ROM (read only memory), a RAM (random access memory) and the like, and stores a program and data used for the processes. The CPU 1901 performs the data compression process and the data decompression process described above by executing the program using the memory 1902.

In the data compression apparatus in FIG. 3, the compression dictionary holding unit 312 corresponds to the memory 1902, and the compression unit 311, the code output control unit 303 and the encryption unit 304 correspond to the program stored in the memory 1902.

In the data compression apparatus in FIG. 9, the compression dictionary holding unit 912 corresponds to the memory 1902, and the bit addition unit 902, the compression unit 911 and the code output control unit 904 correspond to the program stored in the memory 1902.

In the data decompression apparatus in FIG. 11, the compression dictionary holding unit 1112 corresponds to the memory 1902, and the code input control unit 1102, the decryption unit 1103, and the decompression unit 1111 correspond to the program stored in the memory 1902.

In the data decompression apparatus in FIG. 17, the compression dictionary holding unit 1712 corresponds to the memory 1902, and the code input control unit 1703, the decompression unit 1711, and the bit elimination unit 1706 correspond to the program stored in the memory 1902.

The input device 1903 is, for example, a keyboard, a pointing device and the like, which is used to input an instruction and information from an operator. The output device 1904 is, for example, a display, a printer, a speaker and the like, which is used to output an inquiry to the operator and the processing results.

The external storage device 1905 is, for example, a magnetic disk device, an optical disk device, a magneto-optical disk device, a tape device and the like. The information processing apparatus stores the program and data in the external storage device 1905, and uses them by loading them onto the memory 1902 as needed.

The medium driving device 1906 drives a portable recording medium 1909 and accesses the recorded contents. The portable recording medium 1909 is an arbitrary computer-readable recording medium such as a memory card, a flexible disk, an optical disk, a magneto-optical disk and the like. The operator stores the program and data in the portable recording medium 1909, and uses them by loading them onto the memory 1902 as needed.

The network connection device 1907 is connected to a communication network such as a LAN (local area network), and performs data conversion in accordance with the communication. In addition, the information processing apparatus receives, as needed, the program and data from an external apparatus via the network connection device 1907, and uses them by loading them onto the memory 1902.

FIG. 20 illustrates a method for providing the information processing apparatus with the program and data. A program and data stored in a portable recording medium 1909 or a database 2011 in a server 2001 are loaded onto the memory 1902 of an information processing apparatus 2002. The server 2001 generates a carrying signal carrying the program and data, and transmits it to the information processing apparatus 2002 via an arbitrary transmission medium in the communication network. The CPU 1901 uses the data to execute the program and performs the processes described.

What is claimed is:

1. A non-transitory computer-readable recording medium storing a program for enabling a computer to operate as:
    memory comprising instructions to:
    input compression target data comprising a plurality of symbols;
    hold a plurality of compression dictionaries;
    select a compression dictionary from among the plurality of compression dictionaries on the basis of P symbols immediately preceding an input symbol, P being an integer equal to or more than one, and encode the input symbol in accordance with the selected compression dictionary thereby generate a compressed code;
    store a generated compressed code;
    encrypt, in a plurality of compressed codes generated from the plurality of symbols, a plurality of (P+1)K+1-th compressed codes corresponding to a plurality of values of K, K being an integer equal to or more than zero, and not to encrypt P compressed codes between two of the plurality of (P+1)K+1-th compressed codes, thereby generate a plurality of compressed and encrypted codes; and
    output the plurality of compressed and encrypted codes and other compressed codes that have not been encrypted in the plurality of compressed codes.

2. The recording medium according to claim 1, wherein the computer selects the compression dictionary from among the plurality of compression dictionaries on the basis of one symbol immediately preceding the input symbol, and encodes the input symbol in accordance with the selected compression dictionary, encrypts odd-numbered compressed codes in the plurality of compressed codes, and outputs the compressed and encrypted data in which the compressed and encrypted codes are placed in odd-numbered positions and the other compressed codes are placed in even-numbered positions.

3. The recording medium according to claim 1, wherein the computer selects the compression dictionary from among the plurality of compression dictionaries on the basis of two symbols immediately preceding the input symbol, encodes the input symbol in accordance with the selected compression dictionary, encrypts 3K+1-th compressed codes in the plurality of compressed codes, and outputs the compressed and encrypted data in which the compressed and encrypted codes are placed in 3K+1th positions and the other compressed symbols are placed in even-numbered positions.

4. The recording medium according to claim 1, wherein the computer encodes a symbol string including the input symbol in accordance with the selected compression dictionary, to generate the compressed code.

5. The recording medium according to claim 1, wherein the computer outputs the compressed and encrypted data in which the plurality of compressed and encrypted codes are collected and placed in one place.

6. A non-transitory computer-readable recording medium storing a program for enabling a computer to operate as:
   memory comprising instructions to:
   input compression target data comprising a plurality of symbols;
   add an arbitrary bit string to a head of the compression target data;
   hold a plurality of compression dictionaries;
   select a compression dictionary from among the plurality of compression dictionaries on the basis of the bit string or a symbol immediately preceding an input symbol, and encode the input symbol in accordance with the selected compression dictionary thereby generate a compressed code;
   store a generated compressed code;
   encrypt, in a plurality of compressed codes generated from the plurality of symbols, a plurality of (P+1)K+1-th compressed codes corresponding to a plurality of values of K, K being an integer equal to or more than zero, and not to encrypt P compressed codes between two of the plurality of (P+1)K+1-th compressed codes, thereby generate a plurality of compressed and encrypted codes; and
   output, to a first output destination, a compressed code generated from the bit string and a compressed code generated from an even-numbered symbol in the compression target data and not to output the compressed code generated from the bit string and the compressed code generated from the even-numbered symbol in the compression target data to a second output destination that is different from the first output destination; and
   output, to the second output destination, a compressed code generated from an odd-numbered symbol in the compression target data and not to output the compressed code generated from the odd-numbered symbol in the compression target data to the first output destination.

* * * * *